United States Patent [19]
Osborn

[11] 3,865,561
[45] Feb. 11, 1975

[54] SELECTIVE PLUGGING OF FILTER ELEMENTS

[76] Inventor: Jack S. Osborn, 4041 S. Richmond, Tulsa, Okla. 74135

[22] Filed: May 18, 1972

[21] Appl. No.: 254,383

Related U.S. Application Data
[63] Continuation-in-part of Ser. No. 139,723, May 3, 1971, Pat. No. 3,712,114.

[52] U.S. Cl.............................. 55/18, 55/270, 55/97, 55/274, 55/341, 55/419, 73/38, 356/207
[51] Int. Cl............................................. B01d 46/00
[58] Field of Search ........... 55/18, 21, 212, 213, 97, 55/270, 274, 341, 419; 73/38, DIG. 11; 116/DIG. 25, 114 F, 114 N; 356/207

[56] References Cited
UNITED STATES PATENTS

| | | | |
|---|---|---|---|
| 1,026,471 | 5/1912 | Siefken | 55/419 |
| 1,487,898 | 3/1924 | Stolp | 356/207 |
| 1,969,627 | 8/1934 | Simon et al. | 356/207 |
| 2,638,688 | 5/1953 | Hazelton | 73/38 |
| 2,696,666 | 10/1972 | Johnson et al. | 73/38 |
| 2,892,510 | 6/1959 | Wygant | 55/212 |
| 2,892,512 | 6/1959 | Watts et al. | 55/213 |
| 3,243,156 | 3/1966 | Shoemaker | 251/63 |
| 3,395,514 | 8/1968 | Bub | 55/97 |
| 3,452,935 | 7/1969 | Herold | 251/63 |
| 3,710,559 | 1/1973 | Harris et al. | 55/341 |
| 3,712,114 | 1/1973 | Osborn | 73/38 |

*Primary Examiner*—Bernard Nozick
*Attorney, Agent, or Firm*—Head & Johnson

[57] ABSTRACT

This invention is concerned with the testing, while in use, of porous bags used as filters for removal of particulate matter from particulate matter-laden inlet air. It is directed primarily to the detection of major openings or tears in the bags through which large volumes of effluent carrying the particulate matter can escape. It utilizes a means for determining whether the effluent gas contains sufficient particulate matter to be observed or detected, and it involves means for selectively closing off one of the plurality of bags and observing the resulting change in the effluent. If with a given selected bag closed off, the effluent is less dust- or particulate matter-laden, then the closure is left on that particular bag. If there is no apparent change in the effluent another selected bag is closed off and so on.

11 Claims, 6 Drawing Figures

PATENTED FEB 11 1975 3,865,561
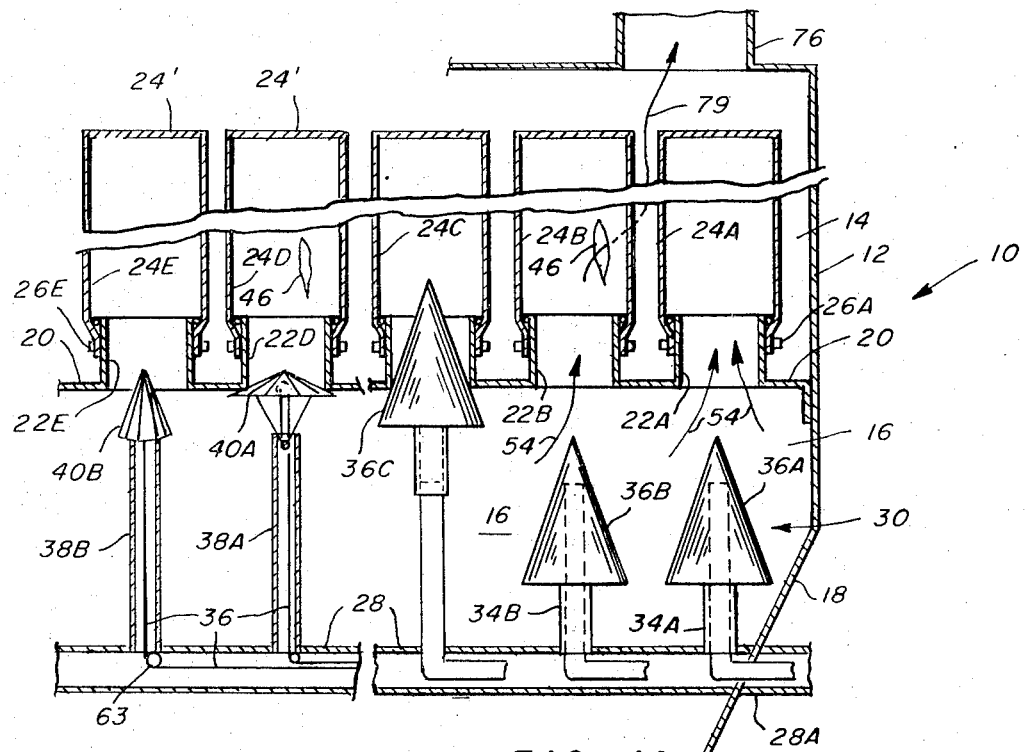
FIG. 1B    FIG. 1A
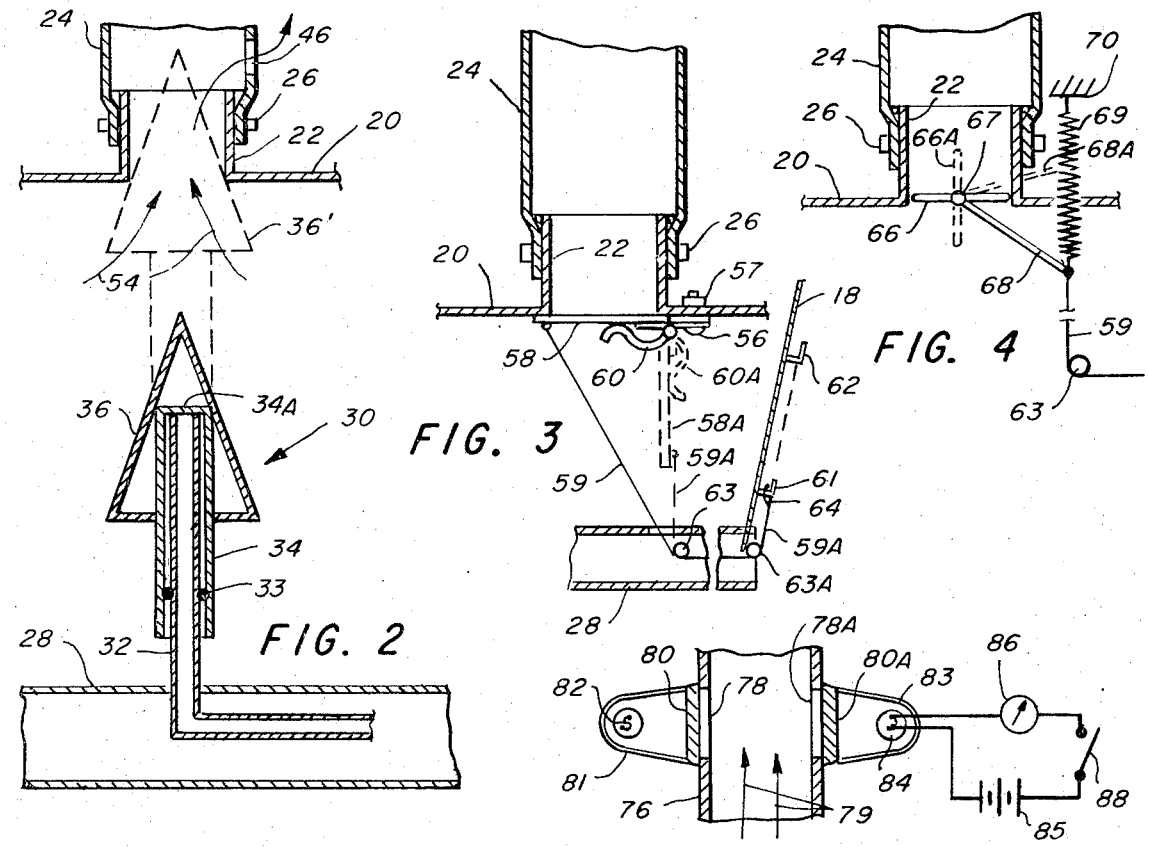
FIG. 2    FIG. 3    FIG. 4
FIG. 5

SELECTIVE PLUGGING OF FILTER ELEMENTS

CROSS REFERENCES TO RELATED APPLICATIONS

This application is a continuation-in-part of my copending application Ser. No. 139,723 filed May 3, 1971 now U.S. Pat. No. 3712114 issued Jan. 1, 1973 and entitled "DUST BAG QUALITY TESTING SYSTEM."

BACKGROUND OF THE INVENTION

This invention is concerned with devices for filtering dust or other particles from particlate matter-laden air. More specifically it is concerned with devices which contain a plurality of dust collecting elements, such as porous bags, which are connected in parallel through a tube sheet, and which receive particle-laden air, from an air inlet chamber, and pass the air through their porous walls into an outlet air chamber, while retaining the particulate matter, or dust, on the surface of the bags. Still more particularly, this invention is concerned with means for locating a particular selected bag which has a large tear, or opening, through which the particle-laden inlet air escapes into the effluent, which flows through an outlet conduit.

In the prior art there has not been a satisfactory way of selectively testing each of the plurality of bags and closing off the air flow through any bag found to be faulty. This means that the entire baghouse has to be shut down periodically so that visual inspection could be made of each bag and the faulty ones replaced. This procedure was unsatisfactory since it either took the entire system out of service, or it required complex construction and valving, etc. to selectively shut down only parts of the system, for visual inspection of the outer surfaces of the bags.

In my copending application I have described systems in which a probe unit can be inserted into any selected bag to close off the inlet air flow to that bag. By measuring flow rate and pressure of a test gas, the condition of the bag can be determined. Thereafter if a bag is found to be defective to an extent which makes it necessary to shut it off, probe means are described for shutting off completely, and semi-permanently, any selected one of the bags. While this application is directed to a similar problem it is more specifically directed to the bag condition in which there is a large opening or tear through which the inlet air can escape directly to the outlet conduit without having the air filtered by the bag. To do this, any of the apparatus described in my copending application may be used in part for the solution of the problem of this application and to that extent the prior application is made part of this application by reference.

SUMMARY OF THE INVENTION

This application is directed to a much simpler situation in which semi-permanent closure means can be built into the bag structure in such a way that by remote control, either by mechanical or pneumatic means, a closure can be placed across any selected one of the tubes in the tube sheet thereby closing off the inlet air flow to a selected bag. If, in the operation of the filter system as a whole, the effluent passing out through the terminal conduit shows an abnormal amount of dust, then this is indication that one or more of the bags are defective and must be closed off. The method of operation then is to selectively close off one or more bags at a time until it is determined that by closing off a selected bag there is an appreciable change in the character of the effluent. This would indicate that the particular bag closed off has been ineffective in filtering. If there is no appreciable change in the effluent, then the bag that has been closed off is reopened and successively other bags are closed until there is an improved appearance in the character of the effluent gas.

This invention is particularly adapted to the carbon black industry where hydrocarbon gas is burned with insufficient air so that there is a large volume of carbon left unburned, which passes through the flame into the outlet of the combustion chamber, and through a bag house filter. Here the carbon black particles are collected on the inside surface of the filter, and periodically dumped through the bottom of the filter into a collection sump. If one of the bags should rupture and provide a large tear or opening, then the restraining pressure on that particular bag is reduced. Thus a large part of the incoming carbon-laden air passes through that bag. As it does so, the effluent gas becomes darker in color and changes its appearance. This change is so pronounced that it can be distinguished by eye, or by the use of photoelectric density measuring devices or the equivalent.

Because these carbon black installations are run at high temperature and have large volumes of gas flow through them, they are expensive to construct and operate and any down time required for the maintenance and replacement of a bag can be extremely expensive. It is therefore important to have a quick method of closing off a given bag without interrupting the operation of the baghouse. While the process of measuring the permeability of the bags described in my copending application can be used in this case, the precision of measurement of permeability is not required. A quick method of closing off a selected bag and a method of observing the resultant change in character of the effluent will serve to quickly determine which bags are ineffective. Then a semi-permanent closure can take them out of service.

It is a principal object of this invention to provide a means for rapidly and simply determining which one or more of a plurality of dust collecting bags is defective to the extent that it has a large tear or opening through which a large volume of the dust or particulate matter in the entering air pass directly through the opening into the effluent. The object further provides simple means to quickly close off a defective bag.

This and other objects and the principles of this invention will be better understood from the description taken with the appended drawings in which:

BRIEF DESCRIPTION OF THE DRAWINGS

FIGS. 1A and 1B show partial views of a typical baghouse in which the invention can be utilized.

FIGS. 2, 3, and 4 show various embodiments of apparatus for closing off a selected protobag.

FIG. 5 illustrates one embodiment of a device for determining the amount of particulate matter in the effluent gas.

DESCRIPTION OF PREFERRED EMBODIMENTS

Referring to the drawings and particularly to FIG. 1A, there is shown one embodiment of this invention. Numeral 10 indicates generally the baghouse with external wall 12 and with tube sheets 20, dividing the inlet air space 16 below the tube sheet from the outlet air space 14 above the tube sheet. The outlet air space 14 connects to an effluent conduit 76. The tube sheet 20 has sealed through it a plurality of short bag tubes 22A, 22B...22E to which the dust collecting element, or particulate matter collecting elements, or bags, 24A, 24B...24E are fastened by means of clamps 26 surrounding the bag and the tubes. The bags are closed at their upper ends 24' and are of pervious material, so that the incoming particulate matter-laden air flows upward 54 through the tubes 22 into the bags 24 and through the walls of the bags into the outlet air space 14. The dust collects on the inside surfaces of the bags. At selected intervals the bags are jarred or shaken to free the dust from the inside surface. The dust falls downward through the tubes into the hopper 18 at the bottom of the inlet air space, from which it is removed periodically.

Occasionally a bag will become torn or open 46. When this happens the bag is ineffective in its operation, since it is possible for the inlet air to flow through an opening such as 46 without being filtered. This contaminates the rest of the filtered air in the outlet air space. When any of these conditions arise it is important to know about it so that steps can be taken to correct the conditions.

Sometimes the filter system is used so that the effluent air will be clean enough for environmental purposes and the dust which is collected may have little or no commercial value. On the other hand, in those cases where the filter system is used in a carbon black manufacturing operation, it is the particulate matter, or the carbon particles, that are the product of the operation, and therefore must be saved. When a tear or opening occurs, not only is the environment affected, but the valuable product is being lost. Very prompt operation is required to close off any defective torn bags, so that this loss will be stopped promptly. In the case of carbon black manufacture, it is also fortunate that the inlet air is so heavily laden with carbon particles that if a tear does occur the effluent gas will be so obviously improperly filtered, both by visual observation and by photoelectric measurement, that it will immediately be obvious that a bag is defective and needs closing off.

As shown in FIGS. 1A and 1B there are devices shown generally by the numeral 30 which are adapted, by remote control means, to be lifted and positioned in the opening 22 through the tube sheet 20 to close off the flow to any selected one of the tubes and therefore to the corresponding bag. In FIG. 1A, in connection with the three bags 24A, 24B and 24C, one embodiment of this invention is shown. This is shown also in more detail in FIG. 2. This embodiment comprises a conical metal sheet 36 which is attached to a vertical tube 34 which is closed 34A at the top. This carries a sealing means 33 and is slipped over a vertical pipe 32 thrugh which compressed air can be provided to lift the tube 34 carrying the conical portion 36 to be positioned as shown by the dash line 36'. In this position the conical portion 36' will cut off the flow of inlet air 54 passing from the inlet air chamber 16 through the tube 22 into the interior of the bag 24 and so out through the large tear or opening 46. When the element 30 is extended vertically, it seats itself in the tube 22 and the pressure of the flowing air keeps it in that position without any further air pressure in the tube 32. At any time that the baghouse is shut down so that the pressure of the inlet in the inlet air portion 16 is dropped to atmospheric, then the shut-off elements 30 will drop back and can again be reset into position, once the flow air through the baghouse is again started.

Referring back to FIG. 1A, in connection with the bags 24D and 24E, there is shown another embodiment of this invention which comprises a tube 3B which is fastened in a vertical position coaxial with the bags. This tube contains an umbrella-like construction of metal vanes 40 which, by the operation of pulling on a cord 36, will cause these vanes to be spread out as shown by the numeral 40A and act as a closure over the opening in the tube 22D. The cord which is pulled, indicated by numeral 36, passes down thrugh the tube 38 which can conveniently be made a part of a horizontal tube 28. The cord 36 passes around pulley 63 and continues out to the outside of the front panel 18 of the inlet air portion. Means can then be provided to pull on, or relax, the cord 36 so as to expand the umbrella or let it fall back as shown by numeral 40B. Also, the tubes 32 indicated or described in FIG. 2 can pass into and through the tube 28 so that at one point 28A they can all be sealed against the escape of inlet air flow through the pipe 28 to the outside of the baghouse.

Shown in FIG. 3 is another embodiment of a very simple closure which comprises a thin disc of metal 58 which is mounted rotatably by means of hinge 56. The fixed portion of the hinge is attached by bolts 57 to the tube sheet 20. Spring means 60 are provided to cause the disc 58 to lift and close off the opening through the tube 22. A cord 59 is attached to the tip of the disc and passes into the conduit 28 over pulley 63 and to the outside wall 18 of the baghouse. There it can pass over another pulley 63A and can be hooked by means of loop 64 over a hook 61, or correspondingly, over a hook 62. These are so positioned that when the loop 64 is hooked over 61 the wire or cord 59 is slack and the spring can press the disc up against and seal the opening through tube 22. When the wire or cord is pulled farther and the loop or eyelet 64 is hooked over the hook 62 then the disc 58 is in the cashed position 58A and is open. This would be the normal position of all of these closure elements, or discs 58, until it was determined that a defective bag is to be searched for. Then, selectively, the cords would be taken off of the hook 62 and put onto hook 61, permitting the disc 58 to close, and shut off the air 54 going up through the tube 22. With the bag shut off, the effluent air would be examined either visually or by photoelectric means, to be described later. If there was a change in the character of the effluent air with the closing of that particular bag then it would be determined that the bag was defective, and so on.

The operation is seen to involve the determination that there is a defective condition in one of the bags as determined from the effluent air. Noting in advance what the condition of the effluent air is, bags are selectively closed off by placing a closure over the tube 22 and determining whether there is a change, for the better, in the effluent gas. If the air shows less color, or less optical absorption, then it is indicative of the fact that the bag is defective and so the closure is left on the bag. An indication is thereby provided by the loop on hook 61, that that bag is closed because it is defective. The closure can stay there until a time is provided, when the bag can be conveniently changed.

FIG. 4 indicates another method by which closure can be mechanically obtained and maintained. This involves the use of a simple metal disc 66 placed inside of the tube 22 and rotatable about a shaft 67. There is an operating arm 68 attached to the shaft 67 so that by pulling down on the cord 59 the arm 68 is pulled down against the resistance of the spring 69 which is anchored at point 70. As the arm 68 is pulled down, the valve is closed. When the cord 59 is released, the spring pulls up on the arm and the valve is open.

FIG. 5 illustrates an embodiment of a detecting instrument by means of which it can be determined that there is too much particulate matter or dust in the effluent gas 79 flowing up a tube 76 which is provided to carry the clean filtered air from the outlet air chamber 14 to other process apparatus or to the atmosphere. One way, of course, to determine that there is too much carbon in the effluent air is to use the conventional smoke charts, and by visual examination determine that the density of the effluent gas corresponds to a particular value of the smoke chart.

In FIG. 5 is illustrated an apparatus for making this determination. It involves two diametrically opposite openings 78 and 78A which are covered by sealed glasses 80 and 80A so that there is a direct view through and across the pipe 76. Over one glass can be mounted a reflector 81 and a lamp 82 which shines light through the opening 78, across the pipe 76, and through the opening 78A into a space containing a reflector 83 and housing a photoelectric device 84. Indicated in FIG. 5 are a switch 88, voltage source 85, and an indicating meter 86 by means of which the absorption of light by the dust laden air 79 passing out through the pipe 76 can be determined. Of course other well known means in the art can be used to measure the optical density of the effluent gas to determine whether it has been properly filtered, or whether there is a defective bag which is polluting the outlet air.

While this invention has been described in connection with a tube sheet, carrying a plurality of tubes passing therethrough, to which the dust collecting elements are connected, it will be clear that other, equivalent methods of mounting said elements can be used.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed:

1. In a self-contained closed apparatus having a single inlet for particulate laden air and a single outlet conduit for effluent for particulate free air, in which more than two particulate-matter collecting porous filter elements are positioned in a single outlet air chamber, and in which each of said elements is connected to and sealed over a separate opening in a tube sheet, said tube sheet separating an inlet air chamber from said outlet air chamber said particulate-matter-laden inlet air passing from an outlet conduit into said inlet air chamber, through said openings in said tube sheet, into said porous filter elements, through the porous walls of said elements and into said outlet chamber, said outlet chamber discharging through said outlet conduit, the method of testing the condition of any one of said elements comprising: selecting a first of the series of openings, selectively closing off the first of said openings;
determining by measuring the concentration of particulate in the effluent whether there has been an appreciable increase in the particulate-matter-laden character of the effluent flowing through said outlet conduit;
if there has not been an appreciable increase in said character, reopening said first opening and in order selecting a second opening of the series and closing said second opening; and
determining by measuring the concentration of particulates in the effluent whether there has been an appriciable increase in the particulate-matter-laden character of the effluent flowing through said outlet conduit.

2. The method of claim 1 including means to determine the optical density of said effluent.

3. The method of claim 2 wherein said determination is by visual observation and comparison with a reference density.

4. The method of claim 2 wherein said determination is by optical absorption.

5. The method of claim 4 including photoelectric means to measure said absorption.

6. The method of claim 1 including close-off means positioned across a plurality of said openings.

7. The method of claim 6 wherein said close-off means is a butterfly valve.

8. The method of claim 6 wherein said close-off means is a pneumatically operated closure.

9. The method of claim 6 wherein said close-off means is an expandable closure.

10. The method Apparatus of claim 6 wherein said close-off means is a mechanical closure.

11. The method of claim 10 wherein said close-off means is a hinged flapper.

* * * * *